Figure 1:
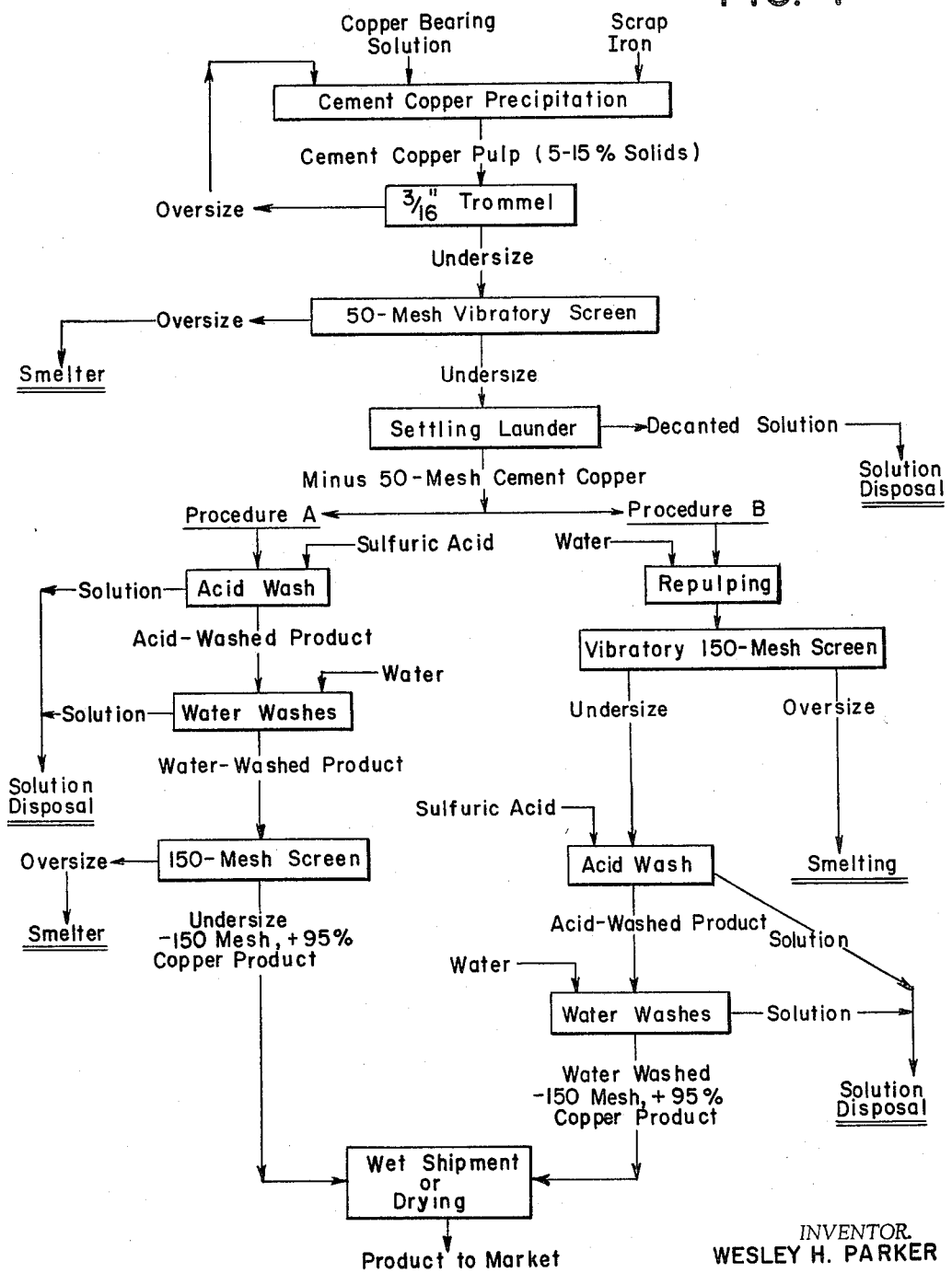

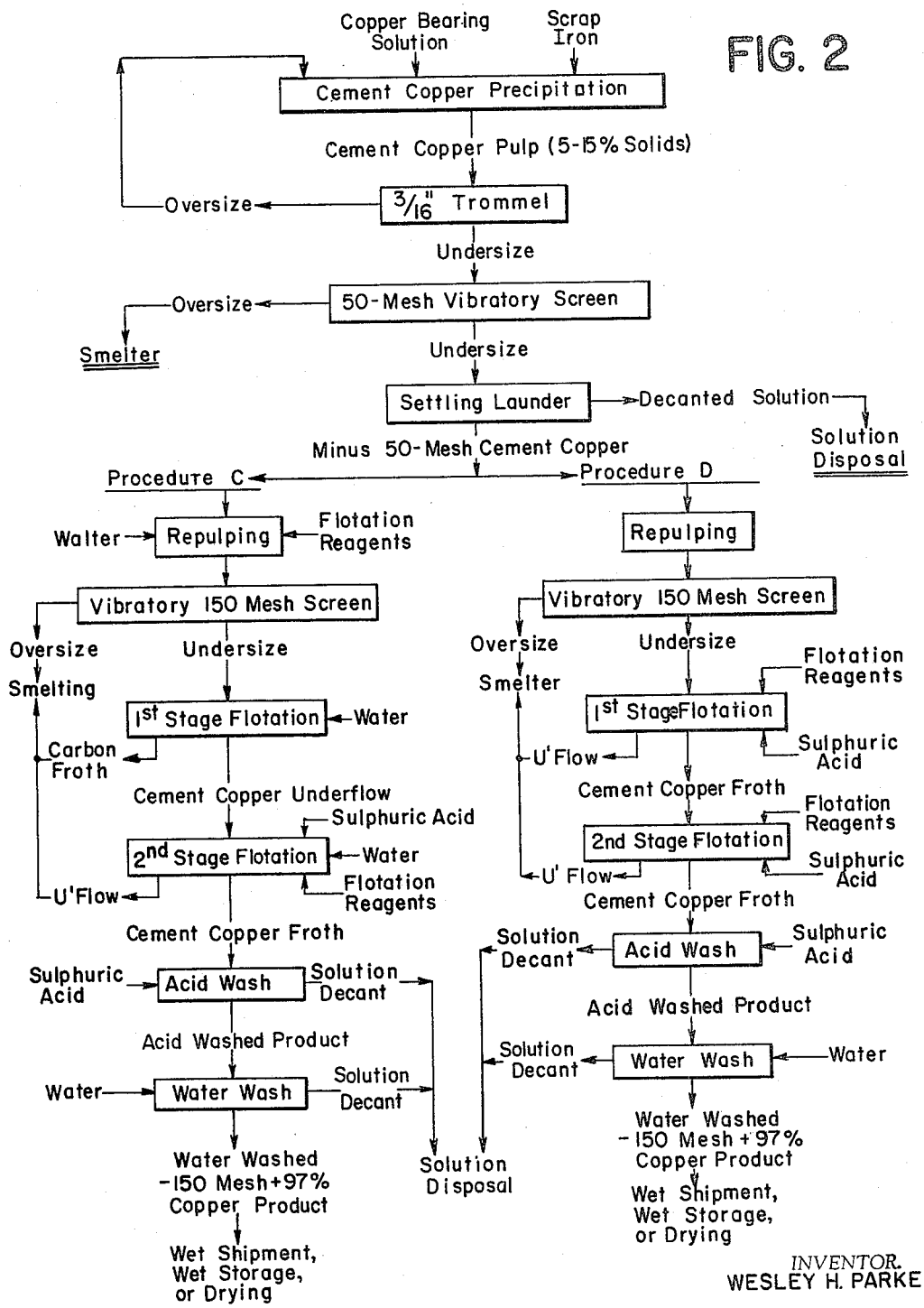

3,282,675
UP-GRADING CEMENT COPPER
Wesley H. Parker, Inspiration, Ariz., assignor to Inspiration Consolidated Copper Company, a corporation of Maine
Filed May 27, 1964, Ser. No. 370,409
12 Claims. (Cl. 75—.5)

This application is a continuation-in-part of my application Serial No. 136,905, filed September 8, 1961, now forfeited.

This invention relates to up-grading cement copper and has for its object the provision of a method by which low-grade cement copper may be converted economically to a high-grade copper powder suitable for marketing as such. The method of the invention makes it possible to produce a finely divided dendritic copper powder suitable for use in the manufacture of brake linings, paints, small articles fabricated by powder metallurgy technique, and other products incorporating copper powder.

The source of copper for the process of this invention is the dissolved copper contained in low copper content solutions which are produced as wash water discards and other solutions in the operation of copper leaching plants, as mine waters in the operation of underground (and other) copper mines, as spent pickle liquors in brass and copper mills, and in various other operations. Such solutions commonly are treated in launders or other vessels with shredded iron or other forms of scrap iron to precipitate an impure finely divided metallic copper product known as cement copper, in accordance with the following well known reaction:

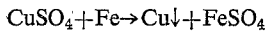
$$CuSO_4 + Fe \rightarrow Cu\downarrow + FeSO_4$$

Cement copper is a low grade form of metallic copper, often containing less than 60% by weight copper. It is heavily contaminated with iron and contains substantial amounts of other impurities as well. It has no substantial commercial use except as a raw material to be treated in copper smelters for the production of copper of commercial purity.

The present invention provides a process by which low-grade cement copper may be converted inexpensively and with a minimum of manipulative operations to a relatively high-grade copper powder product suitable directly for a wide variety of commercial uses. The copper content of the cement copper thus is made available for sale commercially without having to pass it through the customary smelting and refining operations.

The method of the invention is based on first precipitating copper from a copper sulfate solution with metallic iron to produce a low-grade cement copper mixed with iron and suspended in a solution containing dissolved copper and iron salts. The pulp so produced is screened through a 40-mesh to 70-mesh screen to remove undesirable oversize material and coarse undissolved scrap iron. After the undersize product of such screening operation is separated from the solution, the resulting coarse-screened product is treated with a sulfuric acid solution to dissolve acid soluble impurities and precipitated salts that agglomerate copper particles. Sufficient time is allowed for the cement copper particles to settle after which the acid solution is separated from the copper particles. The residue copper particles are subjected to successive water washings before they are screened through a screen at least as fine as 150 mesh to produce a high-grade copper powder product. I have found by this simple sequence of operations, the cement copper which customarily is charged to reverberatory furnace for smelting, can be directly used in many commercial applications.

The fine screening of the coarse-screened cement copper may either precede or follow the acid and water washing operations. The flow sheet and plant operation of the process are somewhat simplified when the acid and water washing opertions precede the fine screening operation; but some improvement in the quality of the final product may be achieved when the fine screening operation precedes the acid and water washings. In either case, the final washed and fine sized copper powder product may be shipped in the still wet condition, or it may be dried, depending on the use to which it is to be put.

Further, I have found copper powder of even greater purity can be obtained economically in accordance with my invention by subjecting the carefully screened and vigorously acid and water washed product to froth flotation. Copper powder containing more than 97% metallic copper is recovered. The invention also contemplates a method in which the final product contains only finely sized copper particles. This is effected by finely sizing the previously screened material, for example passing the material through a 325-mesh screen either before or after the acid and water washing operation.

Following is a detailed description of examples of the invention, presented with reference to the accompanying drawings. FIGS. 1 and 2 are the flow sheets of the process illustrating four alternative procedures of producing greater than 95% pure metallic copper powder. Procedures A and B show the broad disclosure of the invention by which a low-grade cement copper can be upgraded to copper powder containing 95% metallic copper. Procedures C and D show alternative additional treatments of upgraded cement copper by a froth flotation operation to copper powder containing more than 97% metallic copper.

The initial separation of the precipitated cement copper from the undissolved iron and insoluble trash that accompanies the scrap iron delivered to the cement copper precipitation launders advantageously is effected by coarse screening in a trommel. The cement copper pulp fed to the trommel by a gentry crane contains 60 to 70% solids, with the moisture being in the form of copper bearing solution from the precipitation operation. A trommel equipped with a 9/16 inch punched stainless steel plate as the screening element may be used with advantage. Trommel screen oversize is recycled back to the cement copper precipitation launder for further dissolution of the iron. The solids content of the trommel undersize generally will contain about 5% to 15% by weight copper. The reduction in solids content is due to the introduction into the trommel of fresh water in order to enhance the iron-copper separation during the trommel action. Iron is the chief impurity, but other impurities also are present.

Grade of the cement copper reporting as trommel undersize is dependent upon the following variables:

(1) Grade of iron received for use in the precipitation of cement copper.
(2) Copper, acid, and ferric iron contents of the solutions passing through the cement copper precipitation operation.
(3) Volume of solutions passing through the cement copper precipitation operation per unit of time.
(4) Frequency of digging cement copper from the precipitation launders and the rotation of such digging of the individual launders.
(5) Amount of suspended ore slimes and dissolved gases carried by the solutions passing through the cementation operation.

Because of these variables, the assay of the cement copper in the trommel undersize is given as a range rather than as a typical or average value. It is this trommel undersize which is subjected to the upgrading process of this invention to produce a copper powder product suitable for commercial sale.

The trommel undersize is subjected to a further screening operation, preferably by passing it over a vibratory screen equipped with a 40 to 70-mesh screening element (screen sizes herein specified are U.S. Standard, but corresponding or approximately corresponding screen sizes of other series such as the Tyler series are equally satisfactory). A 50-mesh screening element is very satisfactory for this operation. The solid content of oversize material from this vibratory screen is comprised mainly of particles of iron coated with cement copper, though it may also include some coarse agglomerates of cement copper and coarse insoluble impurities. The oversize material is removed from the process and may be sent to a copper smelter for treatment to recover its copper content.

The vibratory screen undersize passes to a settling launder or other device in which the cement copper precipitate is separated from the solution which has accompanied it from the precipitation operation. The decanted or otherwise separated solution is disposed of in any desired fashion, generally by being returned to an appropriate point in the cement copper precipitation or preceding operations or by being discarded.

The solids residue from the settling launder, composed of minus 50-mesh cement copper, assays typically from 70 to 85% copper, from 3 to 15% iron, a few percent of silica and like insoluble matter, variable amounts of undissolved copper and iron salts, and small amounts of other impurities. This material is subjected by either of two procedures to acid washing and fine screening operations to produce a final copper powder product suitable for commercial sale. These two alternative procedures, designated on the accompanying flow sheet as Procedure A and Procedure B, differ mainly in the order in which the washing and fine screening operations are carried out.

In accordance with Procedure A, the impure cement copper residue from the settling launder is first subjected to an acid washing operation. To this end the cement copper is charged into an agitated washing tank and therein is agitated with an aqueous acid solution. A typical charge to the agitated washing tank consists of about 700 pounds of the wet cement copper (of which 300 to 350 pounds is copper), about 500 gallons of water or dilute copper bearing solution from the cement copper precipitation operation or from the leaching plant or mine in which such solutions originated, and about 70 gallons of 93.2% sulfuric acid. The resulting acid solution with which the cement copper is agitated in the washing tank contains from 175 to 225 grams per liter of acid.

The acid washing cycle involves agitating the charge in the washing tank for a period of time sufficient to dissolve acid soluble impurities and precipitated salts which agglomerate cement copper particles. About 30 minutes is usually long enough for this purpose. At the end of this period agitation is discontinued and the cement copper is allowed to settle quite completely, which it does within about 15 minutes. Generally, no reagents are necessary to effect rapid and essentially complete settlement of the washed copper, but a flocculating agent such as an acrylamide polymer hydrolyte (sold commercially under the trade name "Separan") may be incorporated in the acid wash solution if desired to promote complete and rapid settlement of the copper. At the end of the settling period the acid solution is decanted from the settled copper.

Following decantation of the acid wash solution, the cement copper is subjected to water washing. Preferably three such washings are given to each charge of cement copper to insure substantially complete removal of excess acid and other soluble impurities. Each wash advantageously is effected by diluting the settled copper in the agitated washing tank with about 720 gallons of water, and agitating the charge while the water is being added. When the water addition is completed, agitation is again discontinued and the cement copper is allowed to settle, say for a further period of 15 minutes. The first wash water is then decanted from the settled copper, and the two following washings are administered in the same fashion. After the third wash, the acid has been sufficiently eliminated to reduce the pH of the pulp to about 4.5.

Enough of the final wash water is retained with the washed copper powder so that the contents of the washing unit may be flowed or pumped to a fine screening apparatus. An eccentric motion vibratory screen is advantageously used for this operation. The screening element employed in this final fine sizing operation is of very fine mesh size, preferably 150 mesh or finer, and advantageously 325 mesh. Oversize material from this fine screening operation is withdrawn from the process and may be sent to a smelter for recovery of its copper content. The undersize from the fine screening operation is of a fineness determined by the size of the screening element (it is at least as fine as 150 mesh and advantageously finer than 325 mesh). It contains less than 1% iron, and assays upwards of 95% by weight copper. This product may be either shipped wet, or may be dried in vacuum or in an inert atmosphere to yield a dry powder product. In either event, the final product is of sufficient purity for commercial use in the manufacture of a wide variety of products incorporating copper powder.

Alternatively to Procedure A described above, the minus 50-mesh cement copper residue from the settling launder may be treated in accordance with Procedure B, in the course of which it is subjected to a fine-screening operation prior to being subjected to the acid washing treatment. In this case, the coarse-screened cement copper is repulped with water (or sufficient of the original solution is retained wtih it) to permit handling it in a fine-screening operation. This operation can be done conveniently using stainless steel tanks equipped with mechanical agitators. To each of these agitator units is added coarse cement copper and sufficient water to provide a cement copper pulp density of between 10 and 14 percent. Two or more agitator units are preferred which can be connected in a parallel piping circuit to a pump for discharging one unit at a time while the second unit is being recharged with water and cement copper. No pH adjustment is needed for the agitator-unit pulp, which normally is about 6.5.

The fine screening operation is advantageously carried out with eccentric motion stainless steel vibrating screens equipped with a screening element of very fine mesh size, preferably 150 mesh or finer. The cement copper pulp is fed to the screens by a piping system equipped with a by-pass value ahead of the feed values to the screens. The by-pass value enables the maintenance of proper screen flow rates and still permits proper feed-line pulp velocity to prevent settling of the coarser fraction of the pulp with the feed system. The by-passed pulp is returned to the agitator unit undergoing pumping. I found a flow rate of 20 gallons per minute using a 48-inch eccentric motion vibrating screen to be adequate. It is understood that the flow rate and the size and the number of screens used are dependent on the production capacity desired. After proper screening, the underflow of the 150-mesh screen flows to a distribution box for subsequent treatment. Approximately 10 percent of the screen feed is oversize which is removed to a reject sump. The oversize advantageously is treated at a copper smelter for recovery of copper content.

The undersize product from the fine screening operation is subjected to an acid washing operation. Preferably, this operation is carried out in the same type of apparatus and in essentially the same manner as the corresponding acid washing operation of Procedure A, described above. At the conclusion of the acid washing operation, the copper is subjected to several water washings, again as described above, to produce a final washed copper powder product, minus 150-mesh in particle size, and assaying upwards of 95% copper. This product, like that produced in accordance with Procedure A, may be shipped wet, or may be subjected to a drying operation in vacuum or in an inert atmosphere to produce a dry marketable copper powder product.

Procedure A, in which the coarse-screened cement copper is first subjected to acid and water washing operations and then is subjected to fine screening, has the advantage of being easy to carry out in readily available apparatus, and makes for easier fine screening in consequence of first dissolving the coarse iron particles. It also results in minimum loss of copper particles in the form of agglomerates and with the iron particles in the oversize from the fine screening operation, and thus leads to maximum recovery of copper in the final powder product. Procedure B, on the other hand, at the expense of some complexity in carrying out the fine screening operation, makes it possible to produce a slightly higher grade of copper powder product. Either procedure is commercially practical and yields a copper powder product of commercial quality. It is therefore a matter dependent on prevailing local and market conditions as to which procedure is preferable in any particular case.

The final copper powder product produced in accordance with the invention contains 95% copper minimum, 1% maximum of iron, and 1% maximum of insoluble impurities. When using Procedure B, the grade of the final copper powder product may be increased to 96.5% copper minimum and 0.5% iron maximum. The major impurity in either case is probably oxygen, present on account of some oxidation of the fine copper particles.

Further refinement of this upgraded cement copper to remove other impurities that are not eliminated by processes in accordanve with Procedures A and B, such as carbonaceous material, silica, aluminum oxide, and iron oxides is accomplished in this invention by subjecting the fine size screened cement copper to a froth flotation operation prior to the acid and water washing operations. Heretofore, flotation operation has been used to recover cement copper immediately after it has been precipitated from sulfuric acid solution by metallic iron. The floated copper from the solution containing iron and other impurities is a low quality cement copper requiring additional refining in smelter. I have found by subjecting the cement copper to the simple process of fine sizing in accordance with the described Procedure B prior to the flotation and followed by acid and water washing operations, a copper powder of very high purity is obtained. Two alternative procedures are illustrated in FIG. 2 as Procedures C and D.

In accordance with the Procedure C, the coarsely screened cement copper removed after it is screened through 50-mesh screeens is repulped and finally screened prior to the froth flotation operation. Acid and water washings follow the flotation operation to produce the high quality copper powder for direct commercial applications.

Preferably, the froth flotation is to be carried out in two or more stages with each stage removing selectively certain impurities therein. When the two-stage flotation operation is used, such as illustrated by the flow sheet in FIG. 2, it is advantageous to use the first stage for the removal of carbonaceous substances and the second stage for the flotation of copper to eliminate the siliceous matters.

The repulping operation is done substantially in the same manner as described in Procedure B. Since it is advantageous to float at a low power density, more water than that for Procedure B is used. A typical charge consists of 850 pounds of coarsely screened cement copper in a thousand gallons of charge. After the repulping, the cement copper pulp is conditioned with the addition of conventional flotation reagents. When the first stage is used for floating carbonaceous substances with cement copper depression, suitable reagents, such as an anionic sulfonated type collector, e.g., sodium octyl sulfate and frothing agents, e.g., pine oil are used. The amount of reagents employed varies depending on the operation conditions. Generally, when anionic sulfonated fatty acid and pine oil are used, about 0.009 pound per ton of cement copper for the former and 0.2 pound per ton of cement copper for the latter are adequate. The entire operation of repulping and conditioning is accomplished in about 20 minutes. Again, no pH adjustment is necessary which normally averages about 6.5.

The fine screening operation immediately follows the repulping and conditioning operations in substantially the same manner as previously described using a screen at least as fine as 150 mesh. In a typical charge, about 16% of the screen feed is 150 mesh oversize. The undersize from the screening operation which is discharged to a distribution box for subsequent flotation operation is further mixed with water to lower the solid content therein to about 5% to 7% which is then fed to a battery of flotation cells for selective removal of impurities therein.

The preferred flotation system consists of a plurality of flotation cells arranged in a series. When the flotation operation is more than one stage, the cells are divided into a number of sections equal to the number of states desired. In the two-stage flotation operation, as shown in FIG. 2 for Procedure C, a system that I find to be eminently suitable consists of eight Wemco flotation cells lined with chemical lead and equipped with stainless steel rotor and stator assemblies. The cells are arranged four in a section to provide two sections which are connected in a series. Other flotation apparatus, for example the Denver and the Staffenson flotation machines, also can be used.

The repulped and conditioned cement copper is first fed to the first section of the flotation cells wherein the carbonaceous particles are activated by the flotation agents while the copper particles are depressed. The activated carbonaceous particles are being carried out by the froth formed in the first section of the flotation operation together with a small amount of copper, generally less than 18% of the feed. The underflow of copper concentrate is then fed to a second section of flotation cells for copper flotation. The retention time in this section of the cells is about 15 minutes.

The underflow from the first section of froth flotation cells is necessarily reconditioned for the second stage flotation operations. Froth flotation collectors such as dixanthogen together with froth agents, e.g., pine oils, branch chain alcohols, etc., are added to the underflow. The amount of reagents required varies in a wide range. I find using dixanthogen as collector and a conventional frothing agent, 6 to 8 pounds of the former per ton of copper and 1 to 2 pounds of the latter per ton of copper to be adequate. The pH of the solution is adjusted by the addition of sulfuric acid to about 2.0. The copper recovered from the froth of the second section is then subject to further treatment of acid and water washings to produce substantially pure copper powder product. The froth from the first flotation section and the underflow from the second section contain a certain amount of copper which is treated advantageously in a copper smelter for recovering the copper value therein.

The froth product from the flotation cells flows by gravity from the froth launders to a large-size stainless steel tank equipped with an agitator for subsequent acid and water washing operations. When the tank is substantially filled, the floated copper product is allowed to settle for a period of about 20 minutes after which the copper-free solution is siphoned off. Any copper carried off in the siphoning operation is recovered in an appropriate settling sump. The clear siphoned solution is returned to the leaching tank solution for subsequent use. The cycle of filling, settling and siphoning is repeated until a sufficient amount of floated copper is recovered in the tank.

Acid washing immediately follows the last siphoning operation substantially in the same manner as described in previous procedures. Due to the flotation operation, a thin layer of oxide coating is formed on the surface of the copper particles. The period for acid washing must be sufficient to allow the acid to dissolve completely the oxidic coating as well as other impurities contained therein. The acid concentration in this operation is preferably about 50 grams of $H_2SO_4$ per liter of solution for a period of about 30 minutes.

Water washing operation after the acid washing is also carried out in a similar fashion as that described in previous procedures. 4 to 5 wash cycles are generally used to dilute the residue acid contained in the copper powder to a pH of about 4.5. Following the final water washing, the copper powder may be pumped to storage or to a boxcar for direct shipment to the customer. The copper product produced in this process has an assay average of 97.9% copper, 0.16% iron, 0.45% insolubles, and 0.42% copper.

Alternatively, the cement copper can be floated in an acid circuit, as described in Procedure D, in which both flotation stages are used to float the cement copper. In this procedure, suitable froth flotation agents for the flotation of copper such as those used in the second stage of Procedure C, are added into the pulp. In addition, depressants may also be used in the operation for depressing other impurities such as silica depressant sold commercially as Aero depressant. The pH of the pulp is adjusted to about 2 or below with the addition of $H_2SO_4$. The froth from the first stage containing the copper powder is fed to the second stage for further refinement. Additional reagents and acid are added to recondition the pulp and the froth from the second stage is subject to further treatment similar to that of Procedure C. The retention time of the pulp in the first and the second stages is about 15 minutes each. This procedure produces a copper product having an average assay of 98.0% copper, 0.42% iron, 0.63% insolubles, and 0.42% carbon.

Both Procedure C and Procedure D produce high purity copper powders with direct commercial applications. Procedure C is generally used when a closer tolerance of the carbon and an insoluble content of the final product is desired.

I claim:
1. The method of producing copper powder which comprises precipitating copper from a copper sulfate solution with metallic iron to produce a low-grade cement copper mixed with iron and suspended in a solution containing dissolved copper and iron salts, screening the pulp so produced through a 40-mesh to 70-mesh screen to remove undesirable oversize material and coarse undissolved scrap iron, separating the undersize product of such screening operation from the solution in which it was suspended, treating the resulting coarse-screened product with a sulfuric acid solution to dissolve acid soluble impurities and precipitated salts that agglomerate copper particles, allowing the cement copper particles to settle, separating the acid solution from the copper particles, subjecting the residual copper particles to successive water washings, and screening the washed copper product through a screen at least as fine as 150 mesh to produce a high-grade copper powder product.

2. Method according to claim 1, in which the washed copper product is screened through a screen at least as fine as 325 mesh to produce a copper powder product containing less than 1% iron and more than 95% metallic copper.

3. Method according to claim 1, in which the acid solution contains a flocculating agent to help settle the copper particles.

4. The method of producing copper powder which comprises precipitating copper from a copper sulfate solution with metallic iron to produce a low-grade cement mixed with iron and suspended in a solution containing dissolved copper and iron salts, screening the pulp so produced through a 40-mesh to 70-mesh screen to remove undesirable oversize material and coarse undissolved scrap iron, separating the undersize product of such screening operation from the solution in which it was suspended, suspending the resulting coarse-screened cement copper in water, screening the suspended material through a screen at least as fine as 150 mesh, treating the minus 150-mesh undersize product with a sulfuric acid solution to dissolve acid soluble impurities and precipitated salts that agglomerate copper particles, allowing the cement copper particles to settle, separating the acid solution from the copper particles, subjecting the residual copper particles to successive water washings, and separating the wash liquor from the washed copper particles to produce a high-grade copper powder product.

5. Method according to claim 4, in which the suspension from the coarse-screening operation is screened through a screen at least as fine as 325 mesh to produce a copper powder product containing less than 1% iron and more than 95% copper.

6. Method according to claim 4, in which the acid solution contains a flocculating agent to help settle the copper particles.

7. The method of producing copper powder which comprises precipitating copper from a copper sulfate solution with metallic iron to produce a low-grade cement copper mixed with iron and suspended in a solution containing dissolved copper and iron salts, screening the pulp so produced through a 40-mesh to 70-mesh screen to remove undesirable oversize material and coarse undissolved scrap iron, separating the undersize product of such screening operation from the solution in which it was suspended, suspending the resulting coarse screened cement copper in water, screening the suspended material through a screen at least as fine as 150 mesh, subjecting the minus 150-mesh undersize product to a froth flotation operation, treating the resultant copper powder with a sulfuric acid solution to remove substantially the oxidic coating on said copper powder and the soluble impurities and precipitated salts that agglomerate copper particles, allowing the cement copper particles to settle, separating the acid solution from the copper particles, subjecting the residual copper particles to successive water washings, and separating the wash liquor from the washed copper particles to produce a high-grade copper powder product.

8. The method of producing copper powder which comprises precipitating copper from a copper sulfate solution with metallic iron to produce a low-grade cement copper mixed with iron and suspended in a solution containing dissolved copper and iron salts, screening the pulp so produced through a 40-mesh to 70-mesh screen to remove undesirable oversize material and coarse undissolved scrap iron, separating the undersize product of such screening operation from the solution in which it was suspended, suspending the resulting coarse-screened cement copper in water, screening the suspended material through a screen at least as fine as 150 mesh, subjecting the minus 150-mesh undersize product to a froth flotation operation comprising a plurality of flotation sections with each section removing at least one impurity therein, treating the resultant copper powder with a sulfuric acid solution to remove substantially the oxidic coating on said copper powder and the soluble impurities and precipitated salts that agglomerate copper particles, allowing the cement copper particles to settle, separating the acid solution from the copper particles, subjecting the residual copper particles to successive water washings, and separating the wash liquor from the washed copper particles to produce a high-grade copper powder product.

9. The method of producing copper powder which comprises precipitating copper from a copper sulfate solution with metallic iron to produce a low-grade cement copper mixed with iron and suspended in a solution containing dissolved copper and iron salts, screening the pulp so produced through a 40-mesh to 70-mesh screen to remove undesirable oversize material and coarse undissolved scrap iron, separating the undersize product of such screening operation from the solution in which it was suspended, suspending the resulting coarse screened cement copper in water, screening the suspended material through a screen at least as fine as 150 mesh, subjecting the minus 150-mesh undersize product to a first froth flotation to float selectively the carbonaceous impurity therein, subjecting the underflow copper concentrate to further flotation treatment in an acid circuit to float the copper powder, treating the floated copper powder with a sulfuric acid solution to remove substantially the oxidic coating on said copper powder and the soluble impurities and precipitated salts that agglomerate copper particles, allowing the cement copper particles to settle, separating the acid solution from the copper particles, subjecting the residual copper particles to successive water washings, and separating the wash liquor from the washed copper particles to produce a high-grade copper powder product assay average about 97% copper.

10. Method according to claim 9 in which the pH in the acid circuit flotation is below about 2.

11. The method of producing copper powder which comprises precipitating copper from a copper sulfate solution with metallic iron to produce a low-grade cement copper mixed with iron and suspended in a solution containing dissolved copper and iron salts, screening the pulp so produced through a 40-mesh to 70-mesh screen to remove undesirable oversize material and coarse undissolved scrap iron, separating the undersize product of such screening operation from the solution in which it was suspended, suspending the resulting coarse-screened cement copper in water, screening the suspended material through a screen at least as fine as 150 mesh, subjecting the minus 150-mesh undersize product to a froth flotation operation in separate stages in an acid circuit at a pH below about 2, feeding the floated copper from one stage to a subsequent stage, treating the floated copper powder from the last stage with a sulfuric acid solution to remove substantially the oxidic coating on said copper powder and the soluble impurities and precipitated salts that agglomerate copper particles, allowing the cement copper particles to settle, separating the acid solution from the copper particles, subjecting the residual copper particles to successive water washings, and separating the wash liquor from the washed copper particles to produce a high-grade copper powder product.

12. Method according to claim 11 in which the flotation operation consists of two stages.

No references cited.

HYLAND BIZOT, *Primary Examiner.*

N. F. MARKVA, *Assistant Examiner.*